(12) United States Patent
Leturcq et al.

(10) Patent No.: US 7,148,394 B2
(45) Date of Patent: Dec. 12, 2006

(54) CERAMIC FOR PACKAGING OF RADIOACTIVE CESIUM

(75) Inventors: Gilles Leturcq, Laudun (FR); Florence Bart, Orsan (FR); Adeline Comte, Caluire (FR)

(73) Assignee: Commissariat a l'Energie Atomique, Paris (FR)

( * ) Notice: Subject to any disclaimer, the term of this patent is extended or adjusted under 35 U.S.C. 154(b) by 680 days.

(21) Appl. No.: 10/309,838

(22) Filed: Dec. 4, 2002

(65) Prior Publication Data
US 2003/0139281 A1 Jul. 24, 2003

(30) Foreign Application Priority Data
Dec. 11, 2001 (FR) .................................. 01 15972

(51) Int. Cl.
*G21F 9/00* (2006.01)
(52) U.S. Cl. ........................................ 588/10; 501/125
(58) Field of Classification Search ................ 502/324, 502/328, 336, 338, 341, 350, 351, 353, 354; 501/125, 123, 126, 127, 135, 136, 137, 138, 501/139, 153; 588/10, 15, 252
See application file for complete search history.

(56) References Cited

U.S. PATENT DOCUMENTS 6,235,678 B1 * 5/2001 Mamedov et al. .......... 502/354

OTHER PUBLICATIONS

S. E. Kesson et al.: Proc. R. Soc. Lond., vol. A405-1986, pp. 73-101, XP001086671, GB, no date.
Database Chemical Abstracts, Accession No. 100:76057 XP002205233 & JP 58 117499 A (National Institute for Research in Inorganic Materials) Jul. 13, 1983.
Database Chemical Abstracts, Accession No. 96:112127 XP002205234 & JP 56 100637 A (National Institute for Research in Inorganic Materials) Aug. 12, 1981.

* cited by examiner

*Primary Examiner*—Edward M. Johnson
(74) *Attorney, Agent, or Firm*—Pearne & Gordon LLP

(57) ABSTRACT

Radioactive cesium is confined in a hollandite structure formed by a process that does not require reducing conditions.

14 Claims, 1 Drawing Sheet

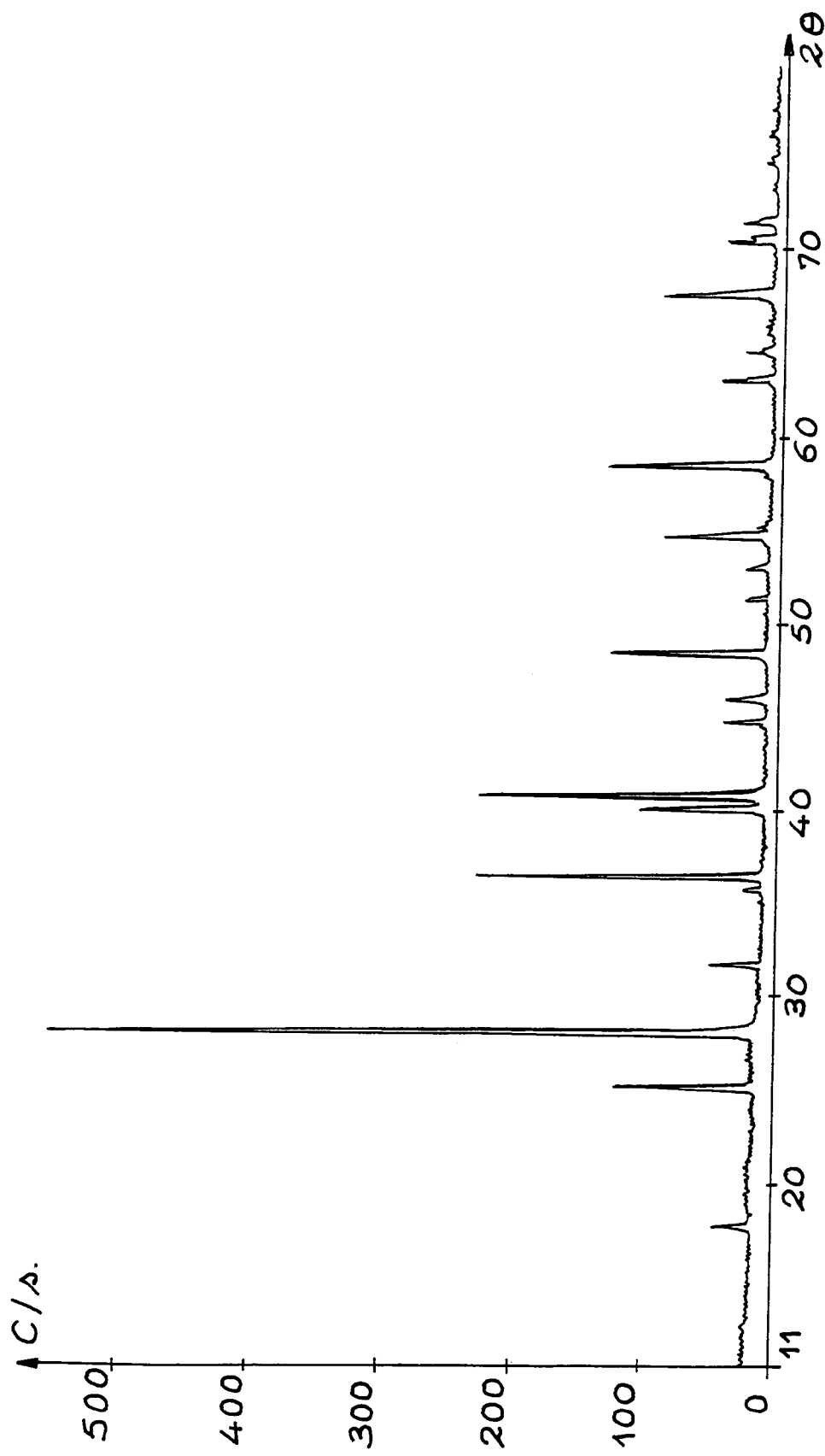

CERAMIC FOR PACKAGING OF RADIOACTIVE CESIUM

TECHNICAL FIELD

The purpose of this invention is ceramics with a hollandite structure based on cesium, and processes for synthesis of such ceramics.

In particular, there are applications for this invention in the confinement of radioactive cesium within the said ceramics, the said radioactive cesium being derived from reprocessing of spent fuels from nuclear power stations.

Radioactive cesium derived from reprocessing of spent fuels in its $^{135}$Cs isotopic form has a long life (2.3×10$^6$ years) and has an extremely high volatility and diffusibility. Therefore it is extremely important that it can be fixed in physically and chemically very stable matrices, to resist geological storage or long term interim storage conditions.

If this element is built into the lattice of an unstable structure, it can diffuse outside the said lattice under the influence of external agents, such as water.

STATE OF PRIOR ART

Cesium was initially confined with other fission products in borosilicated glasses. However, since it is preferable to manage long life radionuclides such as cesium separately, research work was carried out to produce materials with high performances in terms of the capacity of incorporating the cesium element as a quantity by weight, and chemically durable.

At the present time, only two families of minerals are capable of acting as cesium host lattices, namely apatites and hollandites.

Apatites form a family of mineral compounds, the best known of which are fluorided phosphocalcium apatites or hydroxyled $Ca_{10}(PO_4)_6X_2$ where X=OH$^-$, F$^-$, O$^{2-}$ or S$^{2-}$. Many substitutions can be made in this family, and particularly cesium may be introduced instead of calcium.

Hollandites form a structural family that belongs to the cryptomelanes group with the general formula $AB_8O_{16}$, which is represented by the natural mineral $KMn_8O_{16}$. These structures have been studied extensively, particularly considering their geology but also for application in the nuclear confinement field.

Thus, hollandite with the basic formula $BaAl_2Ti_6O_{16}$ is one of the mineral phases present in the SYNROC, which is a polyphased ceramic designed and developed by the ANSTO (Australian Nuclear Science and Technology Organization) to package solutions of fission products derived from reprocessing of spent fuels. The selected composition range for this application is $Ba_xCs_y(Al,Ti)^{3+}{}_{8-2x-y}O_{16}$ where $1.08 \leq x \leq 1.14$ and $1.32 \leq y \leq 1.51$.

A complete study of this composition range was carried out in the article [$Ba_xCs_y$] [$(Al,Ti)^{3+}{}_{2x+y}Ti^{4+}{}_{8-2x-y}$]$O_{16}$ Synroc-type hollandite, Proc. R. Soc. Lond. A405, 73–101 (1986) [1].

This study demonstrated three factors with a strong influence on the incorporation of Cs, Rb or Ba in the hollandites specified above:
- the content of trivalent elements (Al$^{3+}$ and Ti$^{3+}$) is dependent on the quantity of Ba and Cs to be added according to the above formula;
- trivalent elements must not be composed of Al$^{3+}$ alone, but also Ti$^{3+}$;
- the presence of reduced rutile "$TiO_{2-\epsilon}$" is also essential to prevent the formation of undesirable secondary phases such as Ba, Cs titanates where (Ba,Cs)/Ti>0.25, and titanates with three components other than hollandite.

These three conditions have to be satisfied simultaneously if a material is to be obtained in which cesium can be incorporated with satisfactory durability, in other words without any parasite phases. To achieve this, the conditions for synthesis of ceramics must always be reducing.

The only way of obtaining this type of material is to perform sintering under pressure, in a graphite matrix, under a hydrogenated argon atmosphere. Furthermore, powder metallic titanium needs to be added systematically in order to reduce some of tetravalent titanium into trivalent titanium.

Thus, there are two principal disadvantages in prior art for the preparation of ceramic materials with a hollandite structure that could incorporate cesium. Firstly, these materials must always be prepared under reducing conditions, and secondly the quantity of Ti$^{IV}$ actually reduced to Ti$^{III}$ by the addition of metallic titanium is very difficult to control.

PRESENTATION OF THE INVENTION

Therefore the purpose of this invention is to propose a ceramic with a hollandite structure that can include a proportion by weight of cesium, and that can easily be synthesized and in particular can be used to make radioactive cesium confinement matrices.

Another purpose of this invention is to propose processes for synthesis of the said ceramic, that do not necessitate reducing conditions and consequently redox control during synthesis of the said ceramics.

To achieve this, the purpose of the invention is a ceramic based on cesium with a hollandite structure with the following formula:

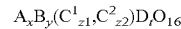

$$A_xB_y(C^1{}_{z1},C^2{}_{z2})D_tO_{16}$$

in which:
A represents the monovalent element Cs, possibly partly substituted by at least one other monovalent element,
B represents the divalent element Ba, possibly partly substituted by at least one other divalent element,
$C^1$ represents the trivalent element aluminium, possibly partly substituted by at least one other trivalent element,
$C^2$ represents the trivalent element iron and/or chromium, possibly partly substituted by at least one other trivalent element,
D represents at least one element chosen in a groupe consisting of tetravalent titanium, divalent, trivalent or tetravalent manganese, pentavalent niobium and pentavalent antimony and mixtures thereof,
x, y, z1, z2 and t are such that:

$0.1 \leq x \leq 0.5$ $0.5 \leq y \leq 1.1$ $1 \leq z1+z2 \leq 2.5$, z1 and z2 are both not equal to zero, $5 \leq t \leq 7$, x, y, z1, z2, t are chosen such that the positive charges of the elements A, B, $C^1$, $C^2$ and D compensate for the negative charges added by oxygen.

In the formula defined above, the element A is preferably composed of cesium Cs alone, which enables a large quantity of the said element to be incorporated in the hollandite structure. But it may be partly substituted by other monovalent elements such as potassium and rubidium. Element B as defined above may be composed solely of the divalent element barium, but the barium may also be partly substituted by at least one other divalent element such as strontium, lead, iron.

The element $C^1$ may be composed entirely of the trivalent element aluminium, but this element may be partly substituted by other trivalent elements such as trivalent vanadium.

The element $C^2$ may be composed entirely of the trivalent element iron, or by the trivalent element chromium or by a mix of trivalent iron and chromium, but these elements can be partly substituted by other trivalent elements such as trivalent vanadium.

Finally, the element D may be composed of the tetravalent element titanium; but may be composed by other elements such as divalent, trivalent or tetravalent manganese, pentavalent niobium and pentavalent antimony and mixtures thereof.

Thus, the ceramic according to the invention may comply with the following formulas:

$$Cs_xBa_y(Al_{z1},Cr_{z2})^{III}Ti^{IV}{}_{(8-x-2y)}O_{16} \text{ or}$$

$$Cs_xBa_y(Al_{z1},Fe_{z2})^{III}Ti^{IV}{}_{(8-x-2y)}O_{16}$$ where x, y, $z_1$, $z_2$ have the same definitions as those given previously and $z_1+z_2=x+2y$.

Note that III and IV in the exponent in the above formulas mean that the elements to which they refer are trivalent ("III") and tetravalent ("IV") respectively.

In particular, the ceramic according to the invention may satisfy the formula 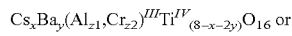 $Cs_{0.28}Ba_1(Al_{1.46}Fe_{0.82})^{III}Ti^{IV}{}_{5.72}O_{16}$.

According to the invention, the quantity of cesium included in the hollandite structure ceramic according to the invention can be varied such that the cesium content is between 1 and about 10% by weight of $Cs_2O$. Thus, the cesium in this type of structure can be incorporated by weight.

According to a particular embodiment of the invention, the cesium present in the compositions described above is a radioactive cesium such as $^{135}Cs$, $^{137}Cs$, $^{133}Cs$.

The use of a ceramic with a hollandite structure according to the invention to incorporate radioactive cesium is particularly attractive. Since cesium is incorporated into the basic lattice of hollandite, it is thus fixed and consequently cannot diffuse through the lattice. Finally, the ceramic according to the invention is extremely stable at high temperatures, consequently the thermal effect due to radioactive cesium, and particularly $^{137}Cs$, will not have any effect on the ceramic. In fact, isotopic separation between $^{135}Cs$ and $^{137}Cs$ is not useful when cesium is packaged in structures according to the invention.

Furthermore, ceramics with a hollandite structure according to the invention have a very low solubility and alterability in water, which limits releases of cesium incorporated into the structure by an aqueous alteration phenomenon.

Another purpose of this invention is synthesis processes for a ceramic based on cesium with a hollandite structure with the following formula:

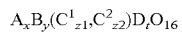 $A_xB_y(C^1{}_{z1},C^2{}_{z2})D_tO_{16}$ in which:
A represents the monovalent element Cs, possibly partly substituted by at least one other monovalent element,
B represents the divalent element Ba, possibly partly substituted by at least one other divalent element,
$C^1$ represents the trivalent element aluminium, possibly partly substituted by at least one other trivalent element,
$C^2$ represents the trivalent element iron and/or chromium, possibly partly substituted by at least one other trivalent element,
D represents at least one element chosen in the group consisting of tetravalent titanium, divalent, trivalent or tetravalent manganese, pentavalent niobium and pentavalent antimony and mixtures thereof,
x, y, z1, z2 and t are such that:

$0.1 \leq x \leq 0.5$ $0.5 \leq y \leq 1.1$ $1 \leq z1+z2 \leq 2.5$, z1 and z2 are both not equal to zero, $5 \leq t \leq 7$, x, y, z1, z2, t are chosen such that the positive charges of the elements A, B, $C^1$, $C^2$ and D compensate for the negative charges added by oxygen.

According to a first embodiment of the invention, the cesium based ceramics with a hollandite structure defined above are prepared by the following sequence of steps:

a) prepare a precipitate containing A, B, $C^1$, $C^2$ and D by mixing a solution of mixed alcoxide containing $C^1$ and D and a saline aqueous solution containing A, B, $C^2$, in stoichiometric proportions;

b) sinter the precipitate from step a) at a temperature of 1150 to 1350° C.

This process thus fixes and immobilizes the cesium in atomic form within a ceramic with a hollandite structure.

The first step of this process consists of mixing a solution of mixed alcoxide of $C^1$ and D prepared in advance with an aqueous saline solution containing A, B, $C^2$ in stoichiometric proportions as a function of the required chemical composition, in order to obtain a precipitate containing the different species of the future ceramic by hydrolysis.

According to the invention, the solution of mixed alcoxide containing $C^1$ and D is preferably prepared by mixing an alcoxide of $C^1$ and an alcoxide of D, in stoichiometric proportions, preferably in a alcohol.

According to the invention, the saline solution is preferably prepared by dissolution of nitrates of A, B and $C^2$ in an aqueous medium.

For example, when A is only Cs, B is only Ba, $C^1$ is only Al, $C^2$ is only Fe and D is only Ti, the alcoxides are titanium propoxide and aluminium sec-butoxide and the nitrates are cesium, barium and iron nitrates.

Chromium nitrate will be used instead of iron nitrate to prepare a ceramic according to the invention with $C^2$ corresponding to Cr.

The second step of the process will then consist of sintering the precipitate at an appropriate temperature for an appropriate time, the optimum temperature being determined by dilatometry.

The process may also comprise a step between steps a) and b) to calcinate the precipitate prepared during step a) at a temperature of 500 to 900° C. This calcination step consists essentially of eliminating the organic compounds and $No_x$. This calcination step thus means that sintering can be done faster later by increasing the temperature more quickly. According to the invention, this step may be preceded by a precipitate drying step in order to partly eliminate the solvents, for example by putting the said precipitate in the rotary evaporator and then in the drying oven.

Finally, the sintering step may also be directly preceded, after the calcinations step if need be, by a cold compression step at a pressure of 40 to 200 MPa, in order to densify the precipitate or the calcinated product.

It is particularly advantageous to grind the precipitate or the calcinated product before carrying out these compression and sintering steps.

For example, in order to carry out this grinding, the precipitate or the calcinated product may be treated in a planetary grinder for an appropriate duration, for example at 300 rpm with zirconium balls in the presence of deionized water, to avoid polluting the powder obtained at the end of this grinding.

It is particularly advantageous if the powder has a relatively high specific surface area, namely a powder grain size of the order of one micrometer, so that sintering can be done at temperatures that are not too high.

According to the invention, the sintering step, possibly preceded by an eventual cold compression and an eventual calcination step, consists of reactive sintering in order to obtain a ceramic with a hollandite structure at the end of this step.

According to a second embodiment of the invention, the cesium based ceramic with a hollandite structure and with the formula defined above may be obtained by a process comprising the following sequence of steps:

c) mix and grind oxides of B, $C^1$, $C^2$ and D and a salt of A in stoichiometric proportions in order to obtain a powder;

d) sinter the powder obtained in step a) at a temperature of between 1150 and 1350° C.

The first step in the process consists of thoroughly mixing the oxides of B, $C^1$, $C^2$ and D with a salt of A.

When A is only Cs, B is only Ba, $C^1$ is only Al, $C^2$ is only Fe, D is only Ti, the oxides could be barium oxide BaO, aluminium oxide $Al_2O_3$, iron oxide $Fe_2O_3$, titanium oxide $TiO_2$ and the salt could be cesium nitrate.

Chromium oxide will be used instead of iron oxide to prepare a ceramic according to the invention with $C^2$ corresponding to Cr.

Ultrasounds can be applied to the different initial materials and the mix can be homogenized using a Turax head, in order to carry out this intimate mixing and grinding step.

The second step of the process consists of sintering the powder. As described above for the first process, this sintering step may be preceded directly by a cold compression step at a pressure of 40 to 200 MPa in order to carry out a first densification of the powder.

The two compression-sintering steps can be carried out under the same conditions as the first process.

The process may also comprise a powder calcination step at a temperature of 500 to 900° C., between steps c) and d), before sintering and the eventual cold compression.

According to a final embodiment, the cesium based ceramic with a hollandite structure with the formula defined above may be obtained by melting a mix in stoichiometric proportions of oxides of B, $C^1$, $C^2$ and D and a salt of A at a temperature between 1400 and 1600° C.

For example, when A is only Cs, B is only Ba, $C^1$ is only Al, $C^2$ is only Fe, and D is only Ti, the oxides could be barium oxide BaO, aluminium oxide $Al_2O_3$, iron oxide $Fe_2O_3$, titanium oxide $TiO_2$ and the salt could be cesium nitrate.

Chromium oxide will be used instead of iron oxide to prepare a ceramic according to the invention with $C^2$ corresponding to Cr.

Thus, the various processes defined above can be used to access cesium based ceramics, with a hollandite structure, with the general formula defined above, particularly the formula $Cs_xBa_y(Al_{z1},Cr_{z2})^{III}Ti^{IV}_{(8-x-2y)}O_{16}$ or $Cs_xBa_y(Al_{z1}, Fe_{z2})^{III}Ti^{IV}_{(8-x-2y)}O_{16}$ where x, y, $z_1$, $z_2$ have the same definitions as those given previously and $z_1+z_2=x+2y$ and more particularly with the formula $Cs_{0.28}Ba_1(Al_{1.46}Fe_{0.82})^{III}Ti^{IV}_{5.72}O_{16}$. In particular, the cesium used in these processes may be radioactive cesium.

Consequently, this invention has an application particularly in packaging of cesium.

Therefore, another purpose of this invention is a matrix for the confinement of radioactive cesium composed of a ceramic with the formula defined above or a ceramic obtained by one of the processes described above, containing radioactive cesium.

Finally, another purpose of the invention is a packaging process for radioactive cesium by ceramization in a confinement matrix with a hollandite structure, the said process comprising the carrying out of one of the processes described above.

The advantage of designing such a matrix is that it can confine the cesium in a chemically stable hollandite type structure that can afterwards be placed in a metallic drum for transport and storage on the surface or buried.

Other characteristics and advantages of the invention will be understood more clearly upon reading the following examples, that are obviously given for illustrative purposes and are in no way limitative.

BRIEF DESCRIPTION OF THE DRAWING

The drawing shows an x-ray diffraction diagram of a ceramic with formula $Cs_{0.28}Ba_1(Al_{1.46}Fe_{0.82})Ti_{5.72}O_{16}$ with a hollandite structure, obtained by sintering an alcoxide precursor.

DETAILED DESCRIPTION OF PARTICULAR EMBODIMENTS

The following examples illustrate the preparation of cesium based ceramics with a hollandite structure with formula $Cs_{0.28}Ba_1(Al_{1.46}Fe_{0.82})Ti_{5.72}O_{16}$ by three different processes.

EXAMPLE 1

Synthesis of a Hollandite with Formula $Cs_{0.28}Ba_1$ $(Al_{1.46}Fe_{0.82})Ti_{5.72}O_{16}$ by Sintering an Alcoxide Precursor The following reagent quantities are used to prepare 100 g of hollandite satisfying the above formula:

$Ba(NO_3)_2$: 37.44 g
$CsNO_3$: 7.82 g
$Fe(NO_3)_3$, $9H_2O$: 48.43 g
Titanium iso-propoxide: 237.70 g
Aluminium sec-butoxide: 53.12 g Iron nitrate, cesium nitrate and barium nitrate are weighed and dissolved in deionized water, in a first beaker. A hot plate has to be used for fast heating to dissolve the barium nitrate quickly.

The mix of aluminium alcoxides and titanium alcoxides is weighed in a second beaker and absolute ethanol is added to produce a well homogenized mix and thus form a mixed alcoxide of aluminium and titanium. This mixed alcoxide is then hydrolyzed by the nitric solution obtained previously by homogenizing and dispersing the precipitate formed using a Turax type homogenizer/disperser (10 000 rpm). The precipitate is then dried using a rotary evaporator to separate the mix of solvents (water/alcohols) from the powder formed during the hydrolysis. The precipitate is then put in a drying oven at 120° C. to complete drying. After de-agglomeration using a porcelain mortar and pestle, the precipitate is calcinated at 750° C. for 2 hours and is then ground for 1 hour at 300 rpm in a planetary grinder using a bowl and zirconium balls in the presence of deionized water. Another drying step is then carried out directly in the drying over at 120° C. All that remains to be done is to form pellets starting from this fine powder by pressing it uniaxially at 40 MPa and sintering the pellets obtained at 1200° C. for 96 hours. Pellets composed of 100% hollandite doped with 5% by mass of cesium oxide are obtained.

The drawing shows an x-ray diffraction plate for a hollandite obtained using the operating method described above, showing the number of strokes per second C/s as the ordinate and 2θ according to Bragg's law as abscissa.

All peaks shown on this plate may easily be indexed using the rays of the hollandite type structure.

The Cs content of the hollandite was determined by an electron scanning microscope with an X-ray analysis. This technique confirmed incorporation of 5% by mass of $Cs_2O$ in the hollandite obtained according to the process described above. It also confirmed the presence of a single phase corresponding to hollandite.

EXAMPLE 2

Synthesis of Hollandite with Formula $Cs_{0.28}Ba_1(Al_{1.46}Fe_{0.82})Ti_{5.72}O_{16}$ by Sintering Oxides The reagent quantities necessary to prepare 100 g of hollandite according to the above formula are as follows:
BaO: 19.42 g
$CsNO_3$: 7.82 g
$Fe_2O_3$: 8.29 g
$TiO_2$: 57.86 g
$Al_2O_3$: 9.43 g The mix of reagents is weighed, deionized water is added, and it is then placed under ultrasounds for 10 minutes, and homogenized and dispersed using a Turax head before being ground in a planetary grinder at 300 rpm for one hour. The mix is then dried in the drying oven at 120° C.; The powder obtained is then calcinated at 750° C. in an alumina crucible for two hours, and is then ground again and then dried as above. The powder is then pressed uniaxially at 40 MPa and the pellets are sintered at 1200° C. for 96 hours.

EXAMPLE 3

Synthesis of a Hollandite with Formula $Cs_{0.28}Ba_1(Al_{1.46}Fe_{0.82})Ti_{5.72}O_{16}$ by Fusion of Oxides The reagent quantities necessary to prepare 100 g of hollandite according to the above formula are as follows:
BaO: 19.42 g
$CsNO_3$: 7.82 g
$Fe_2O_3$: 8.29 g
$TiO_2$: 57.86 g
$Al_2O_3$: 9.43 g According to this process, once weighed, the mix of oxides and nitrates is melted at 1500° C. in a cold crucible. The material obtained is composed of hollandite doped with cesium.

The invention claimed is:

1. A process for synthesis of a cesium based ceramic with a hollandite structure with the following formula:

$$A_x B_y (C^1{}_{z1}, C^2{}_{z2}) D_t O_{16}$$

in which:
A represents the monovalent element Cs, possibly partly substituted by at least one other monovalent element,
B represents the divalent element Ba, possibly partly substituted by at least one other divalent element,
$C^1$ represents the trivalent element aluminium, possibly partly substituted by at least one other trivalent element,
$C^2$ represents the trivalent element iron and/or chromium, possibly partly substituted by at least one other trivalent element,
D represents at least one element chosen in a group consisting of tetravalent titanium, divalent, trivalent or tetravalent manganese, pentavalent niobium and pentavalent antimony and mixtures thereof,
x, y, z1, z2 and t are such that:

$0.1 \leq x \leq 0.5$ $0.5 \leq y \leq 1.1$ $1 \leq z1+z2 \leq 2.5$, z1 and z2 are both not equal to zero, $5 \leq t \leq 7$, x, y, z1, z2, t are chosen such that the positive charges of the elements A, B, $C^1$, $C^2$ and D compensate for the negative charges added by oxygen, the said process comprising the following sequence of steps:
a) prepare a precipitate containing A, B, $C^1$, $C^2$ and D by mixing a solution of mixed alcoxide containing $C^1$ and D and a saline aqueous solution containing A, B, $C^2$, in stoichiometric proportions;
b) sinter the precipitate from step a) at a temperature of 1150 to 1350° C.

2. A process according to claim 1, in which the solution of mixed alcoxide containing $C^1$ and D is prepared by mixing an alcoxide of $C^1$ and an alcoxide of D in stoichiometric proportions.

3. A process according to claim 1, in which the saline solution is prepared by dissolution of nitrates of A, B and $C^2$ in an aqueous medium.

4. A process according to claim 1, in which when A is only Cs, B is only Ba, $C^1$ is only Al, $C^2$ is only Fe and D is only Ti, the alcoxides are titanium propoxide and aluminium sec-butoxide and the nitrates are cesium, barium and iron nitrates.

5. A process according to claim 1, also comprising a step for calcination of the precipitate prepared during step a) at a temperature of 500 to 900° C., between steps a) and b).

6. A process according to claim 1, also comprising a cold compression step at a pressure of 40 to 200 MPa, before step b).

7. A process for synthesis of a cesium based ceramic with a hollandite structure according to the following formula:

$$A_x B_y (C^1{}_{z1}, C^2{}_{z2}) D_t O_{16}$$

in which:
A represents the monovalent element Cs, possibly partly substituted by at least one other monovalent element,
B represents the divalent element Ba, possibly partly substituted by at least one other divalent element, $C^1$ represents the trivalent element aluminium, possibly partly substituted by at least one other trivalent element, $C^2$ represents the trivalent element iron and/or chromium, possibly partly substituted by at least one other trivalent element, D represents at least one element chosen in a group consisting of tetravalent titanium, divalent, trivalent or tetravalent manganese, pentavalent niobium and pentavalent antimony and mixtures thereof, x, y, z1, z2 and t are such that:

$0.1 \leq x \leq 0.5$ $0.5 \leq y \leq 1.1$ $1 \leq z1+z2 \leq 2.5$, z1 and z2 are both not equal to zero, $5 \leq t \leq 7$, x, y, z1, z2, t are chosen such that the positive charges of the elements A, B, $C^1$, $C^2$ and D compensate for the negative charges added by oxygen, the said process comprising the following sequence of steps:

c) mix and grind oxides of B, $C^1$, $C^2$ and D and a salt of A in stoichiometric proportions in order to obtain a powder;

d) sinter the powder obtained in a) at a temperature of between 1150 to 1350° C.

8. A process according to claim 7, in which when A is only Cs, B is only Ba, $C^1$ is only Al, $C^2$ is only Fe and D is only Ti, the oxides are barium oxide BaO, aluminium oxide $Al_2O_3$, iron oxide $Fe_2O_3$, titanium oxide $TiO_2$ and the salt is cesium nitrate.

9. A process according to claim 7, also comprising a step for calcination of the powder obtained in step c) at a temperature of 500 to 900° C., between steps c) and d).

10. A process according to claim 7, also comprising a cold compression step at a pressure of 40 to 200 MPa directly before step d).

11. A process for synthesis of a cesium based ceramic with a hollandite structure with the following formula:

$A_x B_y (C^1_{z1}, C^2_{z2}) D_t O_{16}$ in which:

A represents the monovalent element Cs, possibly partly substituted by at least one other monovalent element, B represents the divalent element Ba, possibly partly substituted by at least one other divalent element, $C^1$ represents the trivalent element aluminium, possibly partly substituted by at least one other trivalent element, $C^2$ represents the trivalent element iron and/or chromium, possibly partly substituted by at least one other trivalent element, D represents at least one element chosen in a group consisting of tetravalent titanium, divalent, trivalent or tetravalent manganese, pentavalent niobium and pentavalent antimony and mixtures thereof, x, y, z1, z2 and t are such that:

$0.1 \leq x \leq 0.5$ $0.5 \leq y \leq 1.1$ $1 \leq z1+z2 \leq 2.5$, z1 and z2 are both not equal to zero, $5 \leq t \leq 7$, x, y, z1, z2, t are chosen such that the positive charges of the elements A, B, $C^1$, $C^2$ and D compensate for the negative charges added by oxygen, the said process including melting of a mix in stoichiometric proportions of oxides of B, $C^1$, $C^2$ and D and a salt of A at a temperature between 1400 to 1600° C.

12. A process according to claim 11, in which when A is only Cs, B is only Ba, $C^1$ is only Al, $C^2$ is only Fe and D is only Ti, the oxides are barium oxide BaO, aluminium oxide $Al_2O_3$, iron oxide $Fe_2O_3$, titanium oxide $TiO_2$ and the salt is cesium nitrate.

13. A process according to claim 1 or 7 or 11, in which the cesium is radioactive cesium.

14. A packaging process for radioactive cesium by ceramization in a confinement matrix with a hollandite structure, comprising the steps of performing the process according to claim 13 including said radioactive cesium, confining the radioactive cesium in said hollandite structure formed by said process and thereby packaging the radioactive cesium with ceramization in the confinement matrix of hollandite structure.

* * * * *